United States Patent Office 2,903,110
Patented Sept. 8, 1959

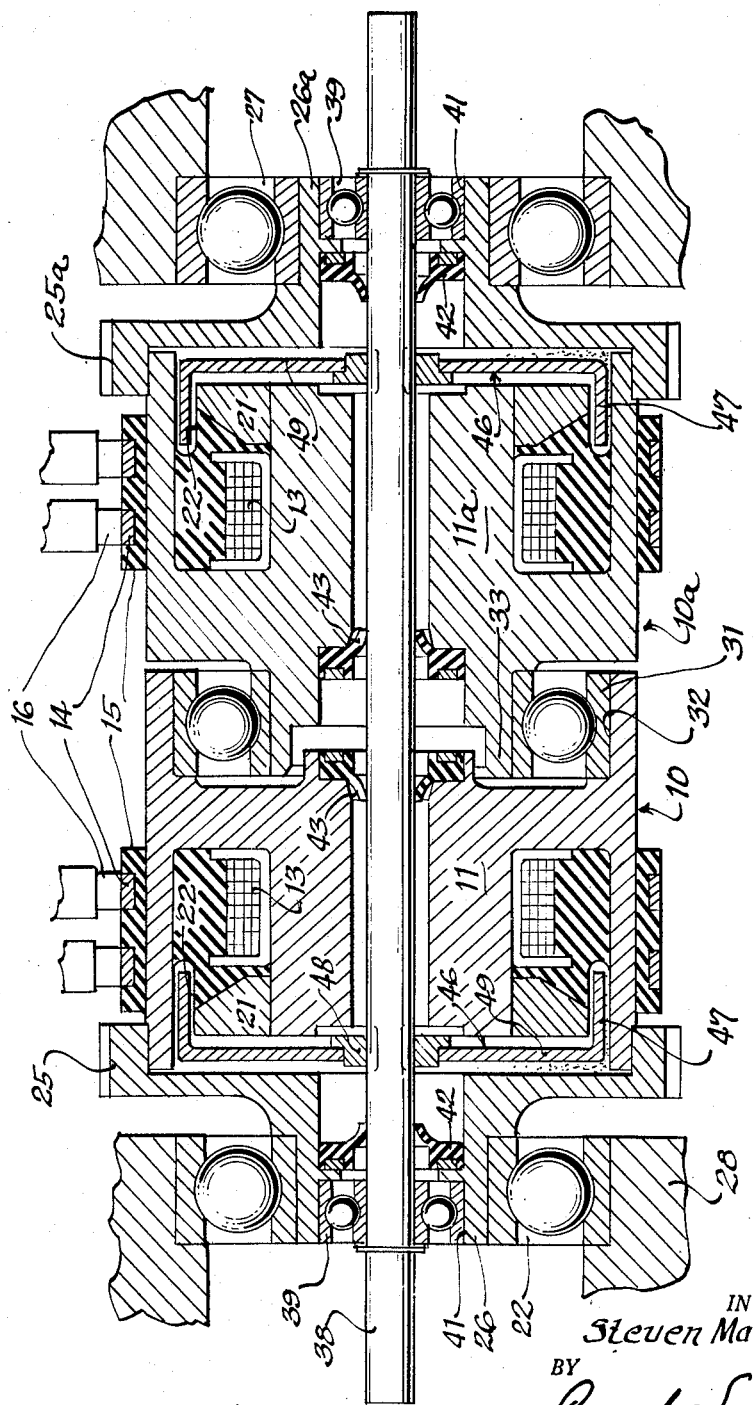

2,903,110

TANDEM ELECTROMAGNETIC CLUTCH CONSTRUCTION

Steven Martin Moody, Grand Rapids, Mich., assignor to Lear, Incorporated, Grand Rapids, Mich., a corporation of Illinois Application October 5, 1956, Serial No. 614,123

4 Claims. (Cl. 192—21.5)

This invention relates to clutches for coupling reversely driven input sources to a single output shaft. In particular it has reference to a tandem arrangement of electromagnetic clutches for selectively providing two directions of rotation to a driven shaft while maintaining the contrarotating driving members on an axis which is also the axis of the driven shaft.

Design considerations frequently require the driving of an output shaft in two directions through electromagnetic clutches of the powdered iron type and space limitations are such that the clutches are desirably to be located not only coaxially but with minimum space occupancy in an axial direction. Such desiderata may obtain in actuators employed aboard aircraft where space may be at a decided premium and weight saving an important factor. While the invention has particular adaptability to clutches of the powdered iron type the same is not to be regarded as so limited.

During recent years there has been an appreciable trend toward the utilization of electromagnetic clutches in which the driving member includes a magnetic core constructed to define an annular gap and an energizing winding providing flux across the gap. The driven member comprises a cup having at least a magnetic rim portion running in the annular gap. Powdered iron is employed to bond the core and cup for driving pursuant to energization of the winding. Such clutches are well known but will be elaborated upon hereinafter to the extent necessary to present an understanding of the invention as embodied exemplificatively in a clutch organization utilizing clutches of this type.

One important field of application of clutches of the foregoing character is in connection with servo mechanisms wherein the clutch is energized and deenergized in an "on" and "off" manner at frequent intervals or, in the case of clutches operating on quiescent current, increasing or decreasing the level of energization. For example, in connection with automatic pilots for aircraft such clutches may be employed to actuate various control surfaces of the aircraft, e.g. ailerons, elevators, rudder and trim tabs, in response to input signals derived from the instantaneous position of the aircraft in pitch, roll and yaw. Such signals are bidirectional and of high frequency. Consequently, it has become the practice to employ a pair of contrarotating clutches, each of which has a driving member carrying an individual winding and core, and arranged to be coupled selectively to an individual driven member of the lightest practical mass consistent with the forces acting thereon. Thus the considerably heavier driving members representing "flywheel" effect may be maintained in rotation constantly and the lighter driven members started and stopped at frequent intervals with minimum lag due to inertia. Thus a rapidly responsive, reversible clutch arrangement may be realized. Additionally, in various forms of electromechanical actuators, there has been a need for a similar clutch arrangement which is extremely compact. In any of these applications it is desirable to mount the driven members of the clutches on a common, output shaft to avoid the complexity and expanse of gearing otherwise necessary to connect the actuated member to the two driven members. However, since minimum moment of inertia of the output side is a desideratum, mounting the two driven members on a common shaft dictates the use of a shaft of minimum weight and therefore one which is slender and easily bent. Consequently, it is not possible to rely on the driven shaft to carry the weight of the heavy driving members.

This invention has for its principal object the provision of a clutch arrangement having a reversible output derived from a pair of contrarotating driving members and in which all of the parts are coaxial and compact.

Another object is to provide a clutch in accordance with the foregoing which employs, to the greatest possible extent, duplicate parts thereby reducing problems of repair and maintenance.

A further object is to provide a clutch organization as aforesaid arranged for rapid dismantling to facilitate servicing.

Other objects will appear from the following description which, taken with the accompanying drawing, illustrates a preferred mode of carrying the invention into practice.

In the drawing the single figure represents a clutch embodying the principles of the invention.

Adverting to the drawing I have shown a pair of substantially identical driving members 10 and 10a comprising respectively a paramagnetic body 11 and 11a of annular form having a space for receiving the energizing windings 13—13.

The input leads of these windings are connected to pairs of slip rings 14—14 mounted on insulating rings 15—15 secured to the periphery of the members 11 and 11a. Brushes 16 connect the rings to a source of control current (not shown).

In order to form an annular magnetic gap of the type customarily employed in electromagnetic clutches in which powdered iron is the coupling medium a pole piece 21, in the form of a ring shrunk into the body 11 and 11a defines, with the body, an annular gap 22. Thus, upon energization of the windings 11 and 11a flux bridges the gap 22 for driving relation as will be described.

The body 11 is provided with a gear 25 rightly fitted over the left end of the body and a hub 26 of the gear 25 is received in an anti-friction bearing 27 supported in the fixed framework 28. A source of power, e.g. an electric motor (not shown) continuously drives the gear 25 in some predetermined direction of rotation.

The body 11a is provided with a gear 25a similar in construction and function to the gear 25 and having a hub 26a mounted in a bearing 27 in the framework 28. Gear 25a is continuously driven by the same source as gear 25 or by a separate source in a direction opposite to that of gear 25.

In order that no part of the weight of the driving members 10 and 10a is thrust on the light weight driven assembly shortly to be detailed there is provided an intermediate anti-friction bearing 31 having its outer race secured in an endwise, cylindrical recess 32 of the body 11 and its inner race fitted over a necked portion 33 of the body 11a. Thus the two heavy rotating bodies 11 and 11a are rendered mutually supporting notwithstanding contrarotation thereof. Moreover an extremely simple construction is obtained whereby replacement of one of the clutches is facilitated upon dismemberment at the bearing 31, and by means which is also compact as compared to those configurations wherein support is afforded by bearings associated with the outer periphery of the clutch.

As alluded to hereinbefore the invention arrangement permits the use of a driven assembly of extremely light weight. In the example a slender shaft 38 is supported at each end in anti-friction bearings 39—39 preferably received in bores 41—41 in the hubs 26 and 26a. However, the points of bearing may lie outside the driving members of the clutch. Conventional seals 42—42 and 43—43 provide a close fit about the shaft 38 to prevent entry of lubricant to the interior of the clutches and spillage of the powdered iron thereout of.

The driven members 46—46 each comprise a cup shaped element including a flange or rim 47 positioned in the annular gaps 22—22 and a hub 48 keyed or otherwise secured to the common shaft 38. It will be understood that part of the space defined between the driven members 46—46 and the driving members 11 and 11a is occupied by powdered iron or a mixture thereof with additives to impart special characteristics to the bonding medium. Thus, energization of a selected winding 13 provides clutching action for rotation of the shaft 38 in the corresponding direction and deenergization allows de-clutching. Inasmuch as the shaft 38 carries, as intermediate loading, simply the two light weight cup members 46—46 the shaft may be made of small diameter whereby the momentum of the driven parts is extremely low. Thus the driven parts may be stopped, started and reversed at comparatively high frequencies compared to those cases wherein the driven shaft also supports part of the driving assembly. It will be understood that the connected load may be attached at either end of the shaft 38.

If desired the flange 49 may be largely perforate to reduce its inertia and to facilitate distribution of the iron powder during the clutching action.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

I claim:

1. An electromagnetic clutch construction comprising a framework, a pair of coaxial, adjacent, contrarotating driving members, ferromagnetic means carried by each of said members defining an annular gap, a winding carried by each member, separate slip ring and brush means connected to each of said windings for energizing said windings selectively to provide a flux field across a respective gap, a cup-shaped driven member individual to each driving member including a flange positioned in said gap, a shaft common to said driven members carrying the same for rotation therewith, said shaft passing through said driving members, means individual to each driving member defining a closed space about each driven member and gap, a mass of pulverulent, ferromagnetic material contained in each said space which, upon selective energization of a winding, bonds the driving and driven members, one of said driving members having a cylindrical recess at one end thereof, the other of said driving members having an annular neck in axially overlapping relation with said recess, and an anti-friction bearing fitted between said recess and neck for mutual support of said driving members.

2. A clutch construction in accordance with claim 1 further characterized by means for supporting said driven shaft on said driving members.

3. A clutch construction in accordance with claim 1 wherein said means comprises a hollow hub at the outer end of each driving member and an anti-friction bearing received within each said hub.

4. A clutch construction comprising a framework, a pair of contrarotating, coaxial, adjacent, driving members having a common central tubular passage through their centers, means for mounting each driving member for rotation of said framework; a shaft passing through said passage in said driving members, said driving members being spaced along said shaft; a ferromagnetic driven member individual to each driving member and connected to said shaft; one of said driving members having a recess on one end thereof to accommodate the other said driving member and an anti-friction bearing located between said recess and said other driving member for mutual support of said driving members; ferromagnetic means on each driving member defining a chamber having an opening adjacent each said driven member; separate electromagnetic means on each driving member for producing and varying electromagnetic fields having lines of force linking the ferromagnetic members on each said adjacent ferromagnetic driving and driven members; and pulverulent ferromagnetic material contained in each said chamber to thereby control the magnitude and direction of torque applied to said shaft.

References Cited in the file of this patent

UNITED STATES PATENTS

| | | |
|---|---|---|
| 2,647,601 | Malick | Aug. 4, 1953 |
| 2,666,154 | Gutman | Jan. 12, 1954 |
| 2,718,157 | Schaub | Sept. 20, 1955 |
| 2,815,106 | Leff et al. | Dec. 3, 1957 |

FOREIGN PATENTS

| | | |
|---|---|---|
| 992,250 | France | July 4, 1951 |
| 1,125,510 | France | July 16, 1956 |